(12) United States Patent
Bronsveld et al.

(10) Patent No.: US 10,260,804 B2
(45) Date of Patent: Apr. 16, 2019

(54) SPRAY MONITORING SYSTEM AND SPRAY MONITORING METHOD

(71) Applicant: Tetra Laval Holdings & Finance S.A., Pully (CH)

(72) Inventors: Eddy Bronsveld, GW Heerenveen (NL); Philip Sytsma, GW Heerenveen (NL)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 138 days.

(21) Appl. No.: 15/106,002

(22) PCT Filed: Dec. 16, 2014

(86) PCT No.: PCT/EP2014/077891
§ 371 (c)(1),
(2) Date: Jun. 17, 2016

(87) PCT Pub. No.: WO2015/091433
PCT Pub. Date: Jun. 25, 2015

(65) Prior Publication Data
US 2016/0320122 A1 Nov. 3, 2016

(30) Foreign Application Priority Data
Dec. 20, 2013 (SE) ........................... 1351542

(51) Int. Cl.
*F26B 3/12* (2006.01)
*H04N 7/18* (2006.01)
(Continued)

(52) U.S. Cl.
CPC .............. *F26B 3/12* (2013.01); *B05B 12/082* (2013.01); *H04N 5/2252* (2013.01); *H04N 5/2256* (2013.01); *H04N 7/183* (2013.01)

(58) Field of Classification Search
CPC ....... F26B 3/12; B05B 12/082; H04N 5/2252; H04N 5/2256; H04N 7/183
See application file for complete search history.

(56) References Cited

U.S. PATENT DOCUMENTS 4,362,273 A * 12/1982 Seino ...................... B01D 1/18
239/128
6,069,652 A * 5/2000 Eversole .............. H04N 5/2252
348/83

(Continued)

FOREIGN PATENT DOCUMENTS

CN 201955597 U 8/2011
CN 201962307 U 9/2011
(Continued)

OTHER PUBLICATIONS

International Search Report (PCT/ISA/210) dated Apr. 7, 2015, by the European Patent Office as the International Searching Authority for International Application No. PCT/EP2014/077891.
(Continued)

*Primary Examiner* — Michael E Teitelbaum
(74) *Attorney, Agent, or Firm* — Buchanan Ingersoll & Rooney PC

(57) ABSTRACT

A spray monitoring system comprises a housing having an outer shroud and an inner shroud and forming an annular clearance therebetween. The inner shroud defines a cylindrical cavity and a window covers a proximal end of the housing. A camera assembly is arranged in the cylindrical cavity and configured to image through the window, and there is a liquid-coolant inlet and a liquid-coolant outlet to allow for a flow of coolant liquid in the clearance.

20 Claims, 2 Drawing Sheets

(51) Int. Cl.
*B05B 12/08* (2006.01)
*H04N 5/225* (2006.01)

(56) References Cited

U.S. PATENT DOCUMENTS

| | | | |
|---|---|---|---|
| 2002/0131781 A1* | 9/2002 | Buck | G03B 17/00 |
| | | | 396/419 |
| 2007/0125962 A1* | 6/2007 | Okabe | H01L 21/67109 |
| | | | 250/492.1 |
| 2009/0139468 A1* | 6/2009 | Saviharju | G01J 5/0044 |
| | | | 122/448.1 |
| 2012/0287285 A1* | 11/2012 | Jensen | B01J 2/04 |
| | | | 348/159 |

FOREIGN PATENT DOCUMENTS

| | | |
|---|---|---|
| CN | 202455440 U | 9/2012 |
| CN | 202902901 U | 4/2013 |
| GB | 1042179 A | 9/1966 |
| WO | WO 2011/063808 A1 | 6/2011 |

OTHER PUBLICATIONS

Search Report issued by the Swedish Patent Office dated Jul. 1, 2014 in counterpart Swedish Application No. 1351542-4 (6 pages).

* cited by examiner

SPRAY MONITORING SYSTEM AND SPRAY MONITORING METHOD

TECHNICAL FIELD

The present invention relates to a method and a system for monitoring sprays, and in particular to such system and method usable in relation to spray dryers.

TECHNICAL BACKGROUND

Within food industry in general and dairy industry in particular use is made of spray dryers. In such a spray dryer liquid food product is forced through a spray nozzle or atomized in another way, mixed with hot air (or entrained into a fast flow of hot air) of and injected into a drying chamber. Any residual water is evaporated and the resulting powder is collected at the bottom of the drying chamber. The result may be a dried powder, e.g. milk powder. Though only described in a few words, the performance of the nozzle is critical for the performance of the overall process of drying the product. The performance and characteristics of the spray nozzle may also have an impact on the particle size. While feeds, temperatures and pressures etc. are parameters that are readily controlled and monitored by standard sensor arrangements, e.g. mass flow meters, thermocouples, pressure sensors, the performance of the spray is not as readily controlled and monitored. The atmosphere inside the drying chamber is harsh, with high temperature, high-speed flows and potentially abrasive particles.

One such system is disclosed in US2012287285 and the present disclosure suggests a improved system for control of the spray forming process.

SUMMARY

In order to eliminate or alleviate drawbacks of prior art the present disclosure concerns a spray monitoring system comprising a housing having an outer shroud and an inner shroud and forming an annular clearance therebetween, wherein the inner shroud defines a cylindrical cavity, a window covering a proximal end of the housing, a camera assembly arranged in the cylindrical cavity and configured to image through the window, wherein there is a liquid-coolant inlet and a liquid-coolant outlet to allow for a flow of coolant liquid in the clearance, to allow for the system to be arranged in hostile environments of spray systems.

According to one or more embodiments the system comprises an insert having a proximal end and a distal end and wherein the camera assembly is arranged at a proximal end of the insert.

In one or several embodiments the insert has an end mount at its proximal end, the end mount being configured to cooperate with a proximal end of the cylindrical cavity.

In still further or related embodiments a diameter of the insert tapers off towards the proximal end giving it a frustoconical overall shape in the proximal end.

In one or more embodiments the proximal end of the cylindrical cavity has a shape matingly fitting with the proximal end of the insert.

The end mount may in one or several embodiments comprise at least two parts arranged with a clearance between them, allowing for a diameter of the end mount to vary resiliently, and posts may in other or related embodiments extend between the end mount and an end fitting at the distal end, wherein the end fitting is configured to seal the cylindrical cavity.

Illumination means may be arranged at a distal end of the insert, to transmit illumination through the window, the illumination means preferably being formed from a LED arrangement, and even more preferably a ring-shaped LED arrangement.

A system according to the above or below may be configured to be used in a high temperature environment of a spray dryer.

According to another aspect the present disclosure provides a method for spray monitoring using a system according to any previous or subsequent description, comprising: arranging the system in a spray dryer, acquiring spray data from the system through simultaneous imaging of one or more sprays, evaluating spray data acquired from the system.

To make full advantage of the systems characteristics it may be arranged in a hot-air inlet of the spray dryer providing excellent overview, and in still other embodiments it may be arranged in an air distributor venturi.

DETAILED DESCRIPTION

Figure 1:
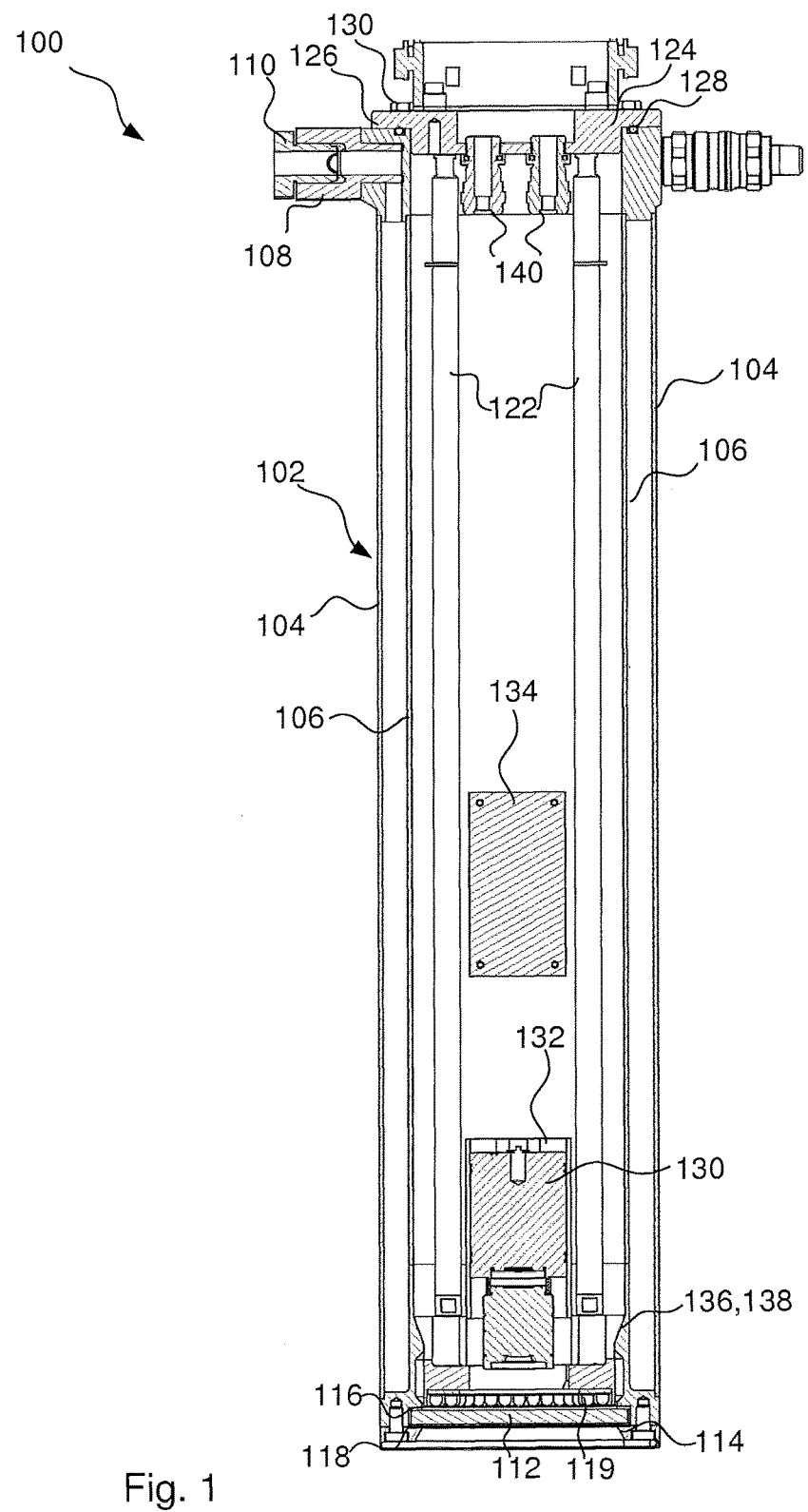
FIG. 1 is a schematic longitudinal section of a system according to a first embodiment of the present invention.

FIG. 1 illustrates a system 100 according to a first embodiment of the present invention. The system 100 comprises a housing 102 having an outer shroud 104 and an inner shroud 106 forming between them an annular clearance for forming a cooling jacket. The housing 102 comprises connectors 108, 110 for guiding a cooling liquid into and out from the annular clearance. The cooling liquid is predominantly water, yet other liquids should not be excluded. At a proximal end of the system a circular glass plate 112 is arranged. The glass plate 112 may be made from fused silica withstanding comparatively harsh environments in terms of temperature and chemicals, while also providing a satisfactory spectral transmittance. Other alternatives may include sapphire glass or borosilicate glass, depending on the application. A retaining ring 114 keeps the glass plate 112 in place. While not fully visible in FIG. 1 one or more gaskets 116, 118 ensure a tight connection between the glass plate 112 and its contact with the housing 102 (gasket 116), while also distributing forces between the retaining ring to the glass plate (gasket 118). Each gasket is suggestively formed form one piece and extends along the perimeter, inside of the outer radii, of the glass plate.

In the housing 102, radially inside of the inner shroud 106 a cylindrical cavity is formed. The cylindrical cavity is delimited in the proximal end by the glass plate 112 while the distal end is open.

The portion of the system disclosed thus far may form a housing unit. It may be possible to dismantle the unit for service purposes, and in the present embodiment that is the case. In other embodiments it may also be possible to use welds, adhesives or other less reversible methods of joining different structural components.

A second part of the system 100 is an insert provided with illumination means at a proximal end thereof. In the present embodiment the illumination means comprises a LED-ring 119 formed from a number of LED light sources arranged in a ring-shaped formation. The LED-ring 119 is arranged to transmit light (or more generally "radiation" if outside the visible spectrum) through the glass plate 112. In the present embodiment the LED-ring comprises two concentric circles each made from a number of LED light sources. The LED-ring is arranged on an end mount 120. Three posts 122 extend from the end mount 120 towards the distal end. At the distal end the posts are fitted to an end fitting 124. The end fitting 124 performs several structural functions, one being to seal the open distal end of the cylindrical cavity. In the present embodiment the end fitting 124 has a flange 126 arranged to abut the distal end, with the intermediate positioning of a gasket 128. Machine screws 130 may be used to secure the end fitting 124 to seal off the distal end of the cylindrical cavity. As evident from FIG. 1 it is apparent that the end fitting 124 may comprise further components for other purposes, such as cable glands 140. Also, it is apparent that there may be more or less than three posts 122 and that the function of the posts may be solved by another technical solution.

Moving back to the proximal end of the insert a camera assembly 130 is arranged on a camera mount 132 extending from the end mount 120, and since the camera 130 is arranged to image through the glass plate 112 the end mount 120 is provided with a central opening, and thus the end mount 120 may have an overall ring shape. There may be an imaging assembly 131 (such as a lens/filter combination) arranged for improving the imaging. The camera 130 may be powered by an external power source, and signals to and from the camera may be stored internally, or as in the present embodiment be in communication with an external source (of energy or control parameters), directly or via an internal control unit such as a printed circuit board indicated at reference numeral 134. In the present embodiment the system utilizes an Ethernet connection to transfer data at a high rate.

The end mount 120 may have a tapered portion 136 narrowing off towards the distal end. The tapered portion 136 is arranged to cooperate with a mating tapered portion 138 of the inner shroud 106, such as to provide a centering function as the insert is arranged in the housing unit. In FIG. 1 the reference numerals 136 and 138 have been arranged pointing at the interface between the two. The end mount 120 may in other embodiments be formed from two arcuate parts which together forms the end mount 120. There may be a slot or small slit between the two arcuate parts, wherein the end mount 120 may allow for some structural resilience of its diameter since the two arcuate parts due to the clearance may be arranged closer together or further apart. In this way the end mount 120 may provide a centering function without having an absolute end position in an axial direction. In a related embodiment, where the dimensions and material of the end mount is such that it can offer some internal resilience it may suffice with a single slit for accomplishing the intended function.

Figures 2, 3:
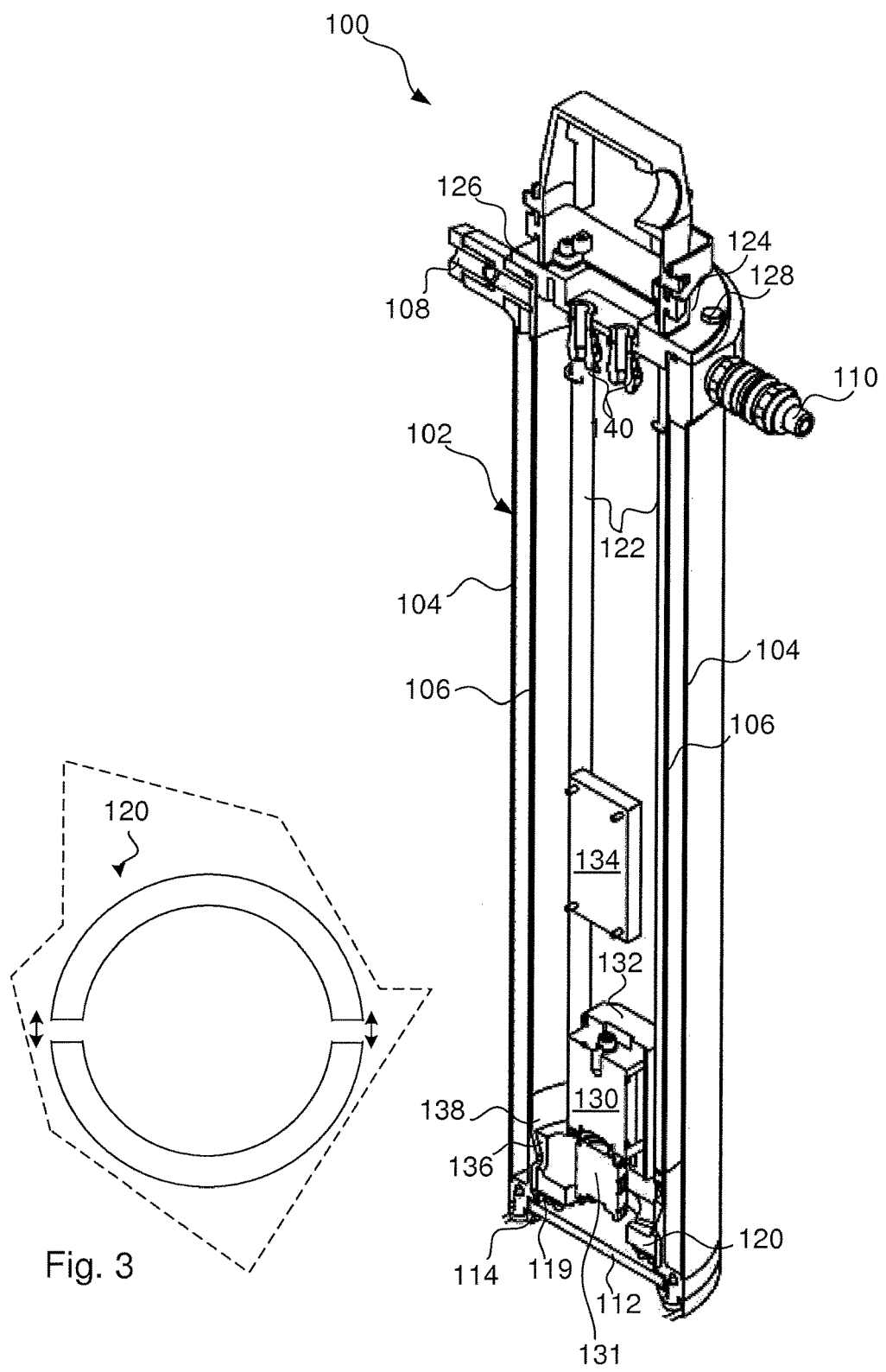
FIG. 2 is a cutaway view in perspective of the device of FIG. 1.
FIG. 3 is a schematic plan view of a component of a system according to a second embodiment of the present invention.

In the cutaway view of FIG. 2 the system of FIG. 1 is shown in perspective. The same reference numerals designate the same components as in FIG. 1, yet the perspective view may add some structural information about the present embodiments.

When constructing a device according to an embodiment of the invention it will by necessity be quite specific. This does not say that the amount of details should be construed as a limiting definition of the present invention as such. It merely implies that for practical embodiments within the intended field of use there are many constructional details to consider, such as the material used, the location of gaskets and screws etc. and a construction suggested by a skilled person given the details of the present invention may be solved different to the solution presented in FIG. 1 and FIG. 2 while remaining within the scope of the present invention as defined by the appended claims.

When arranged in an industrial-scale spray dryer the system would be arranged to monitor high pressure nozzles. According to one concept the system should be arranged in the air distributor venturi's, that is the proximal end of the system is arranged here. This has at least two beneficial effects. The first is that the proximal end will be arranged in an air inlet, before the air is mixed with powder. The environment is harsh, with high air-flow velocities and high temperatures, yet the related benefit is that the imaging system will not be fouled by powder. A second effect is that the imaging system has a good view of most or all spray nozzles. By providing monitoring of this region enables detection of nozzle leakage, irregular spray patterns etc, i.e. parameters which severely affect the performance of the dryer, and having a view free of disturbances enables use of automated detection software for identification of errors.

The system or systems may be connected via Ethernet links with a computer in a control room. Depending on the amount of data transferred a fibre optic connection between the Ethernet hub and computer may be considered. The computer in the control room may show a mosaic of camera images of which one can be selected and shown full screen.

Also from the control room a LED intensity or camera exposure can be controlled to optimize quality of the images and temperature of the camera monitored. The images should be of sufficient quality to facilitate Computer Vision for acquiring, processing, analysing, and understanding images for detecting events.

In a typical application the system may be exposed to high drying air temperatures up to 240° C. which requires active cooling to prevent overheating of the electrical components (camera, LED ring, etc) inside the housing. As an example cooling water of 10-20° C., or what is readily available at the site of application, may be used to cool the outside of the unit using the water inlet/outlet and forming a cooling jacket. The cooling water may leave the housing with a temperature of about 30-40° C. depending on the initial temperature and mass flow of cooling water.

A method according to one or more embodiments of the present invention may comprise the steps of arranging a system according to any preceding embodiment in an air inlet of a spray dryer for monitoring of spray performance. While the preferred embodiments of the present disclosure have been described in detail hereinabove with reference to the accompanying drawings, a technical range of the present disclosure is not limited to the disclosed exemplary embodiments. Specifically, it is to be understood that, as is well known to those skilled in the art, various modification, combinations, and other embodiments may be made depending on designs or other elements within the scope of the claims.

The invention claimed is:
1. A spray monitoring system comprising;
a housing having an outer shroud and an inner shroud and forming an annular clearance therebetween, wherein the inner shroud defines a cylindrical cavity,
a window covering a proximal end of the housing,
a camera assembly arranged in the cylindrical cavity and configured to image through the window, wherein there is a liquid-coolant inlet and a liquid-coolant outlet to allow for a flow of coolant liquid in the clearance, wherein the system comprises an insert having a proximal end and a distal end and wherein the camera assembly is arranged at a proximal end of the insert, wherein the insert has an end mount at its proximal end, the end mount being configured to cooperate with a proximal end of the cylindrical cavity, wherein the end mount comprises at least two parts arranged with a clearance between them, allowing for a diameter of the end mount to vary resiliently.

2. The system of claim 1, wherein a diameter of the insert tapers off towards the proximal end giving it a frustoconical overall shape in the proximal end.

3. The system of claim 2, wherein the proximal end of the cylindrical cavity has a shape matingly fitting with the proximal end of the insert.

4. The system of claim 1, wherein the system is configured to be used in a high temperature environment of a spray dryer.

5. A method for spray monitoring using a system according to claim 1, comprising the steps of:
arranging the system in a spray dryer,
acquiring spray data from the system through simultaneous imaging of one or more sprays,
evaluating spray data acquired from the system.

6. The method according to claim 5, further comprising the step of arranging the system in a hot-air inlet of the spray dryer.

7. The method according to claim 5, further comprising the step of arranging the system in an air distributor venturi.

8. The system of claim 1, wherein the at least one light source comprises a plurality of light sources.

9. The system of claim 8, wherein the plurality of light sources are arranged in a ring-shaped pattern.

10. The system of claim 8, wherein the plurality of light sources comprise a plurality of LED light sources.

11. A spray monitoring system comprising;
a housing having an outer shroud and an inner shroud and forming an annular clearance therebetween, wherein the inner shroud defines a cylindrical cavity,
a window covering a proximal end of the housing,
a camera assembly arranged in the cylindrical cavity and configured to image through the window,
wherein there is a liquid-coolant inlet and a liquid-coolant outlet to allow for a flow of coolant liquid in the clearance,
wherein the system comprises an insert having a proximal end and a distal end and wherein the camera assembly is arranged at a proximal end of the insert,
wherein the insert has an end mount at its proximal end, the end mount being configured to cooperate with a proximal end of the cylindrical cavity,
wherein posts extend between the end mount and an end fitting at the distal end, wherein the end fitting is configured to seal the cylindrical cavity.

12. The system of claim 11, wherein a diameter of the insert tapers off towards the proximal end giving it a frustoconical overall shape in the proximal end.

13. The system of claim 12, wherein the proximal end of the cylindrical cavity has a shape matingly fitting with the proximal end of the insert.

14. The system of claim 11, wherein the system is configured to be used in a high temperature environment of a spray dryer.

15. A method for spray monitoring using a system according to claim 11, comprising the steps of:
arranging the system in a spray dryer,
acquiring spray data from the system through simultaneous imaging of one or more sprays,
evaluating spray data acquired from the system.

16. The method according to claim 15, further comprising the step of arranging the system in a hot-air inlet of the spray dryer.

17. The method according to claim 15, further comprising the step of arranging the system in an air distributor venturi.

18. The system of claim 11, wherein the at least one light source comprises a plurality of light sources.

19. The system of claim 18, wherein the plurality of light sources are arranged in a ring-shaped pattern.

20. The system of claim 18, wherein the plurality of light sources comprise a plurality of LED light sources.

* * * * *